United States Patent [19]

Furda et al.

[11] 4,379,171
[45] Apr. 5, 1983

[54] METHOD FOR PREPARING FOOD PRODUCTS WITH SWEET FRUCTOSE COATINGS

[75] Inventors: Ivan Furda, Wayzata; Shirley C. Gengler, Bloomington, both of Minn.

[73] Assignee: General Mills, Inc., Minneapolis, Minn.

[21] Appl. No.: 309,533

[22] Filed: Oct. 7, 1981

[51] Int. Cl.³ .................... A23L 1/164; A23G 3/00
[52] U.S. Cl. .................... 426/291; 426/103; 426/292; 426/293; 426/303; 426/307; 426/620
[58] Field of Search .............. 426/103, 291, 292, 293, 426/303, 307, 309, 620, 621; 127/30, 60

[56] References Cited

U.S. PATENT DOCUMENTS

| | | | |
|---|---|---|---|
| 2,707,153 | 4/1955 | Bettman | 426/620 X |
| 3,094,947 | 6/1963 | Green et al. | 426/293 X |
| 3,615,676 | 10/1971 | McKown et al. | 426/293 |
| 4,089,984 | 5/1978 | Gilbertson | 426/303 X |
| 4,097,613 | 6/1978 | DeLauder et al. | 426/303 |
| 4,161,545 | 7/1979 | Green et al. | 426/293 X |
| 4,199,373 | 4/1980 | Dwivedi et al. | 127/60 |
| 4,250,195 | 2/1981 | Cherukuri et al. | 426/291 X |
| 4,277,504 | 7/1981 | Radlove | 426/62 |

*Primary Examiner*—Marc L. Caroff
*Attorney, Agent, or Firm*—Gene O. Enockson; John A. O'Toole

[57] ABSTRACT

Disclosed are methods for coating discrete food pieces with a sweet coating such as in the preparation of a presweetened ready-to-eat cereal. The coating contains a mixture of crystalline fructose and high fructose corn syrup. The amorphous fructose of the HFCS is converted in situ into the sweeter beta fructo-pyranose. The method of preparation comprises the steps, in sequence of: (A) providing a base of dried food pieces; (B) applying HFCS seeded with up to 2% powdered crystalline fructose; (C) enrobing dry powdered crystalline fructose onto the cereal pieces in a weight ratio of crystalline fructose to HFCS of from 2:1 to 1:1; (D) coating the food base pieces with an edible oil; and (E) dusting with a dry powdered sugar.

10 Claims, No Drawings

METHOD FOR PREPARING FOOD PRODUCTS WITH SWEET FRUCTOSE COATINGS

BACKGROUND OF THE INVENTION

1. Field of the Invention

The present invention relates to food products and, more particularly, to presweetened ready-to-eat breakfast cereals. In its method aspect, the present invention relates to methods for the preparation of presweetened food products such as ready-to-eat cereals.

2. The Prior Art

Presweetened breakfast cereals have been regularly available for many years. Such cereals have been prepared by first producing unsweetened cereal pieces, particularly puffed cereal pieces, coating the cereal pieces with a slurry or solution of sweeteners and then drying the coated pieces in an oven or air current.

Generally, the primary sweetener for presweetened cereals has been sucrose. Sucrose solutions frequently contain various levels of regular (e.g., 42 D.E.) corn syrup to provide upon drying coatings which are either desirably clear or frosted.

While effective to sweeten cereals, attempts for nutritional reasons have recently been made to reduce the sucrose and/or total sugars content of presweetened cereals. To provide traditional levels of sweetness at reduced concentrations, sweeteners having more sweetening power per unit weight than sucrose (i.e., having higher relative sweetness) must be employed. While certain high potency non-nutritive or "artificial" sweeteners have been suggested for use, both current food regulations and strong consumer prejudice against artificial sweeteners have directed art attempts at providing presweetened cereals employing only nutritive carbohydrate sweetening agents.

Since fructose is 10%-70% sweeter than sucrose, art attempts have been to employ fructose as a sweetening agent for ready-to-eat cereals. Fructose is commercially available in basically two forms, (1) high fructose corn syrup, (hereinafter "HFCS") normally a liquid, (20% moisture) and (2) crystalline fructose which is a solid powder.

High fructose corn syrup has the advantage of being relatively inexpensive compared to crystalline fructose. Employment of HFCS as the principal component of coating for presweetened cereals, however, suffers from several disadvantages. First, coating cereals with HFCS result in a sticky, messy product which at best is extremely difficult to dehydrate to a solid, non-adhesive state. However, at least one method is known within realizes an R-T-E cereal coated with corn syrup by applying a powder coating to eliminate the stickiness (see U.S. Pat. No. 4,089,984 issued May 16, 1978 to Gilbertson, and which is incorporated herein by reference).

Another problem with HFCS is that it is not as sweet as crystalline fructose. Fructose exists mostly in four forms as the alpha-furano, beta-furano, alpha-pyrano and beta-pyrano structures. The sweetness perception of fructose is, however, primarily a function of the amount of the beta-pyrano form. Crystalline fructose, is usually manufactured as theoretically pure anhydrous beta-D-fructopyranose for this reason (although typical analysis indicate only 97.2% beta-pyranose). HFCS, on the other hand, is not as sweet as pure crystalline fructose since it is an amorphous mixture of these non-sweet fructose forms as well as the sweet form and it contains also less sweet glucose. HFCS comprises only about 57-70% of the sweet beta-pyrano form (basis on total fructose). Therefore, crystalline fructose is substantially sweeter on a unit weight basis than HFCS (dry basis).

Accordingly, it would be desirable to be able to transform all or part or "beneficiate" the amorphous mixture of fructose forms which comprise HFCS into the sweet beta-pyrano form to increase the sweetness of the HFCS. Unfortunately, the known properties of fructose suggest that adding crystalline fructose to corn syrup would result in the reverse conversion, that is, the degradation of the crystalline fructose into a mixture including the non-sweet forms rather than the beneficiation of the amorphous HFCS into more sweet forms. It is known that a freshly prepared solution of beta-D-fructopyranose undergoes a transformation called mutarotation to the other forms resulting in a less sweet mixture, HFCS is such a mutarotated or "amorphous" mixture containing only about 57-70% beta-pyranose depending on temperature and concentration. (See, for example, "Encyclopedia of Food Science", pg. 330, ed. by Peterson and Johnson, The Avi Publishing Co., Inc., Westport, Conn. See also U.S. Pat. No. 4,277,504, issued July 7, 1981 to K. A. Kurzins). Adding more pure crystalline fructose to HFCS would not be expected to alter the percentage of the beta-pyrano form since in a short time the pure beta-pyrano form will mutarotate into the amorphous mixture.

It has been surprisingly discovered, however, that by combining crystalline fructose of a particular particle size and HFCS seeded with the powdered crystalline fructose within a certain weight ratio range, that the non-sweet forms of fructose of the HFCS can be converted in situ into the more sweet forms. Accordingly, food products can be prepared with sweetener coatings containing fructose having the sweetness of pure crystalline fructose but formulated with partial replacement of the crystalline fructose with the less expensive HFCS.

Surprisingly, another advantage provided herein by the in situ conversion of amorphous fructose into crystalline fructose on cereal coatings is to reduce the undesirable hygroscopicity of the coating. Reduced hygroscopicity beneficially reduces undesirable clumping or bridging of coated cereal pieces.

SUMMARY OF THE INVENTION

The present invention relates to methods for the preparation of sweetened food products. The present invention is particularly suited for the preparation of ready-to-eat presweetened cereals. The present methods essentially comprise in sequence the following steps. First, pieces of a dried cereal base are provided. The pieces are dehydrated to a final moisture content of less than about 5%. Thereafter, high fructose corn syrup, optionally preconcentrated, seeded with powdered crystalline fructose is applied to the dried cereal pieces to form syrup enrobed cereal pieces. The syrup mixture contains up to about 5% by weight of the syrup mixture of the seeding powdered crystalline. The weight ratio of cereal base to syrup mixture essentially ranges from 1:0.05 to about 1:0.3.

Powdered crystalline fructose is then applied to the syrup enrobed cereal pieces. The weight ratio of crystalline fructose to the HFCS (dry basis) mixture essentially ranges from about 2:1 to 1:1. The particle size range of the powdered fructose essentially ranges from about 15 to 200 microns.

Thereafter, the cereal pieces are enrobed with an edible oil. The weight ratio of cereal base to the edible oil essentially ranges from about 1:0.06 to 1:0.15. The oil is applied at a temperature sufficiently high such that the oil remains liquid while being enrobed onto the cereal base.

Thereafter, the cereal is coated with a dry, solid powdered sugar. The sugar also essentially ranges in particle size between about 15 to 200 microns. The weight ratio of cereal base to total sugar content essentially ranges from about 1:0.15 to 1:1.0. Thereafter, the powdered sugar coated cereal is cooled to less than the melting point of the edible oil.

DETAILED DESCRIPTION OF THE INVENTION

The present invention relates to food products having a fructose-based sweetener coating and to methods of their preparation. The present methods have particular utility in the provision of presweetened R-T-E cereals. The present methods comprise the steps, in sequence, of (a) providing a base of dried food pieces; (b) coating with a HFCS seeded with powdered crystalline fructose; (c) coating with a dry, solid, powdered crystalline fructose; (d) enrobing with a heated edible oil; and (e) dusting with a dry powdered sugar to form the present sugar coated food products. Each of these preparation steps are described in detail below.

Throughout the specification and claims, percentages and ratios are by weight and temperatures given in degrees Fahrenheit, unless otherwise indicated.

A. Providing a Base of Dried Food Pieces

The present methods of preparation essentially comprise the step of providing a base of dried food pieces. The food pieces could be of any food type which is desired to be provided with a sweetened coating and include, for example, puffed popcorn or other grains, nuts, candies, and the like. The present methods find particular utility in providing ready-to-eat cereals with a presweetened coating. In the following detailed description of the present invention, even though particular reference is made to a base comprising R-T-E cereals, it is understood that the present invention also finds application in other food areas. The cereal pieces can be of any geometric configuration or form including, for example, flakes or puffs, or the like. The present invention finds particular utility in the coating of puffed cereals.

Any conventional puffed cereal or method of preparation can be used herein to provide a puffed cereal base. The art is replete with such compositions and their methods of preparation and the skilled artisan will have no problem selecting suitable compositions or methods of preparation. Exemplary compositions and methods of puffed cereal preparation are found in, for example, U.S. Pat. Nos. 3,464,827, (issued Sept. 2, 1969 to T. Tsuchiya, et al.); 3,600,193, (issued Aug. 17, 1971 to E. F. Glabel, et al.); 3,246,990, (issued Apr. 19, 1966 to Thompson, et al.); and 3,687,687, (issued Aug. 29, 1972 to A. L. Liepa), each of which is incorporated herein by reference.

For those food products requiring low moisture contents, it is important that any drying operation is performed prior to the coating of the HFCS. Typically, for example, puffed cereal bases must be dried to relatively low moisture contents in order to have the desired crispness or frangibility. Thus, when a puffed cereal is the food base in the present methods of preparation, it is essential to dry the puffed cereal base pieces to a moisture content of less than about 4%, and preferably less than about 3%, prior to the application of the HFCS. Typically, past methods of R-T-E cereal preparation have dried the cereal pieces after application of various types of surface coatings to dehydrate the pieces to form dry coated cereal pieces. In the present method of preparation, however, the oil coating can prevent moisture escape from the interior of the cereal piece. Additionally, moisture addition to the cereal after fructose coating is to be strictly avoided in contrast to past methods involving applications of sugar solutions or slurries. Moisture addition can deleteriously cause mutarotation of the sweet fructose forms into the mixture of non-sweet and sweet forms.

Any conventional drying technique can be used to reduce the moisture content of the cereal base pieces. The drying can be accomplished using equipment such as a rotary bed, tray, or belt driers. Simple hot air convection drying, e.g., 140° F. to 180° F., is the preferred technique for practicing the present cereal piece drying.

B. Coating with a HFCS

In the present method of preparation, the next step in sequence is to coat or to enrobe the dried cereal pieces with a high fructose corn syrup which has been seeded with powdered crystalline fructose.

HFCS is made by hydrolysis of corn starch to a mixture of glucose and oligosaccharides followed by partial isomerization of the glucose to fructose. Similar compositions can be obtained from starches other than corn. The particular glucose, fructose and oligosaccharides content desired in the HFCS product can be achieved by varying the extent of hydrolysis and isomerization reactions employed. The small amounts of nitrogen compounds, salts, and colored impurities present in the liquors after isomerization are removed almost completely by treatment by carbon ion exchange resins. Currently, the most widely used HFCS typically contains 42% fructose, 52% glucose and 6% oligosaccharides (dry basis). Recently, however, corn syrups which are up to 92% fructose (dry weight) have become available for use. Preferably, the fructose content of the syrup is as high as is possible, i.e., about 90% (dry weight).

Commonly, HFCS is 20%±5% moisture. If desired, the HFCS can be subjected to a prior drying step to remove some of the moisture to thereby increase the dry solids content and to reduce the potential for undesirable mutarotation. Thus, the predrying of the HFCS can be practiced so as to provide a syrup having a moisture content of less than about 10%. Preferably, the moisture removal step precedes the addition of the seeding agent.

It is essential in the present method of preparation that the HFCS be seeded with powdered crystalline fructose. The amount of crystalline fructose to be added to the HFCS essentially ranges from about 1 part to 4 parts per 100 parts HFCS (dry basis). It is also important that the fructose be powdered, i.e., wherein less than about 10% remains on a U.S. standard size No. 60 screen (250 micron sized opening). While the precise phenomenon is not clearly understood, it is speculated herein that the addition of the powdered crystalline fructose as a seeding agent enables the in situ transformation of the amorphous forms of fructose into the desired, sweet beta-D-fructopyranose more quickly. Of course, it is desirable to mix the HFCS after the addition of the powdered crystalline fructose to ensure a homogeneous blend.

The seeded HFCS is then applied to the pieces of the cereal base. Desirably, the weight ratio of cereal base to seeded HFCS ranges from about 1:0.05 to 1:0.30, and preferably from about 1:0.1 to 1:0.2.

In the present process, the HFCS may be applied to the cereal pieces, for example, using an enrober drum while the HFCS is at an elevated temperature and thus fluid. The HFCS may be at a temperature of between about 212° F. to 300° F., and preferably between 240° F. and 280° F.

C. Applying Crystalline Fructose

After the cereal pieces have been coated with the seeded HFCS, the next essential step of the present methods is to apply or coat the pieces with crystalline fructose. Desirably, the weight ratio of total crystalline fructose, including that which has been used as a seeding agent, to the seeded HFCS (dry basis) ranges from about 1:1 to about 2:1. While the precise phenomenon is not understood, insufficient amounts of crystalline fructose in admixture with the HFCS fail to result in the extent of beneficiation of the amorphous HFCS. Furthermore, above weight ratios of about 2:1, further crystalline fructose addition fails to provide significant beneficiation effects.

In a preferred embodiment of the present invention, it is also desirable that the applied crystalline fructose be powdered. The particle size range of the fructose essentially ranges from about 15 to 250 microns. It has been surprisingly discovered that powdered fructose having a particle size or particle size distribution within the above-given range adheres better to the HFCS coated cereal base pieces and thus allows the realization of R-T-E cereals having desirably high ratios of sugar coating to cereal base. Another advantage of being within the above-given range maintenance of powdered fructose particle size is that the sugar coated pieces lose less of their sugar coating upon handling, i.e., exhibit lower sugar losses. Still another advantage of employing powdered fructose of the given particle size is that greater amounts of fructose are able to be coated unto the cereal piece per given surface area. Large granulation fructose can result in unevenly coated cereal pieces exhibiting a blotched coating. Also, while the precise phenomenon is not understood, for a given level of fructose, the sweetness perception appears to drop off with either too large a particle size or too small a particle size. When too fine a particle size fructose is employed, poor adherency during processing results in undesirable fructose build-up on processing equipment. Suitably sized, powdered fructose is commercially available. Powdered fructose having a particle size within the above-given range can also be prepared from simple screening of other commercial fructose blends. Higher particle size fractions can then be milled and sieved to prepare suitably sized powdered fructose. Minor amounts, i.e., a few percent, of under or oversized fructose particles can be tolerated without departing from the advantages of the present invention.

Another benefit provided by the present invention is that by virtue of the capturing of the dry crystalline fructose by the HFCS, the dry material substantially eliminates the cohesiveness and stickiness of the cohesives which have disadvantages associated in the art with cereals coated with conventional liquid sweeteners.

D. Enrobing with an Edible Oil

After dusting with the crystalline fructose, the cereal base is essentially enrobed with an edible oil. The weight ratio of cereal base to edible oil essentially ranges from about 1:0.5 to 1:0.15, preferably from about 1:0.06 to 1:0.10. Insufficient amounts of edible oil can adversely affect the adherency of the powdered fructose coating expressed as high fructose coating losses. Excessive oil application, however, can adversely affect the organoleptic properties of the finished product.

It is important that the edible oil have a melting point ranging from about 70° F. to 120° F. Lower melting point oils are generally too low in viscosity to provide good adhesion of the sugar. High melting point fats are to be avoided so as to avoid a waxy mouthful when the product is consumed.

It is important that both the cereal base and edible oil be sufficiently warm during the enrobing step such that the oil remains liquid while being enrobed onto the cereal base to form a liquid oil enrobed cereal base. Thus, the cereal base should be at least about as warm as the melting point of the oil. Generally, the cereal base is still warm from the application of the HFCS and can range up to 160° F. in temperature and to successfully be coated with oil. Preferably, the coated cereal pieces are at least about 100° F. Moreover, the oil should be sufficiently warm so as to remain liquid after it has been applied to the cereal base pieces. Good results are obtained when, for example, the oil is applied at a temperature ranging of approximately 20° F. to 40° F. above its melting point, that is from about 90° F. to 160° F.

Suitable edible oil or fatty triglyceridic materials include, for example, those derived from any of the naturally occurring glyceridic materials such as soybean oil, cottonseed oil, peanut oil, sesame seed oil, sunflower seed oil, palm oil, and coconut oil. Other suitable edible fatty triglyceridic materials and methods of their preparation are described in detail in Bailey "Industrial Oil and Fat Products," published by John Wiley and Sons Publishing Company, NY. Typically, such glyceridic materials will be partially hydrogenated (i.e., to an iodine value of less than about 80 (to extend shelf storage). The preferred edible oil for use herein is 98° coconut oil (i.e., hydrogenated to have a melting point of about 98° F.).

Any conventional application apparatus and technique can be employed to practice the present oil coating step. Thus, for example, the oil can be sprayed onto the cereal base pieces while being tumbled in an enrober.

E. Coating with Powdered Sugar

The oil enrobed cereal bases is next essentially coated with a powdered sugar coating while the oil is still liquid. The cereal base to sugar coating ratio essentially ranges from about 1:0.01 to 1:0.06.

The sugar which is employed as the final dusting or coating can be any sugar and is not limited to fructose. Thus, the term "sugar" is used in its conventional sense to refer to both mono- and disaccharides including sucrose, dextrose, crystalline fructose, glucose, and mixtures thereof. In one embodiment, however, the sugar is merely additional crystalline fructose. In another preferred embodiment, the sugar is sucrose.

Again, it is desirable that the sugar be powdered, i.e., range in particle size from about 15 to 200 microns. Suitably sized powdered sugar of various types are commercially available, e.g., 6X. Alternatively, appropriately sized powdered sugar can be obtained by simple milling and screening to provide suitably sized powdered sugars.

The final sugar coating step can be practiced using conventional coating equipment again, such as an enrober. While the edible oil is still liquid, the powdered sugar can be simply added to the enrober and the cereal base pieces tumbled until substantially all the sugar has been picked up.

In one embodiment, the powdered sugar is desirably sucrose. In this embodiment, problems such as bridging and moisture pickup due to the the hygroscopity of other sugars is avoided while retaining the advantages of having high levels of fructose as the sweetener. An additional benefit to the final dusted coating of sugar is that this layer very quickly dissolves into the milk, thereby sweetening the milk.

Of course, it is within the scope of the present invention to apply the crystalline fructose and the oil in more than a single operation. Thus, initially a portion of the crystalline fructose, e.g., 50%, can be applied to the syrup-coated cereal pieces. Thereafter, a portion of the oil, e.g., an equivalent percentage, 50%, can be applied. Afterwards, a portion of the balance of the crystalline fructose can be applied while thereafter a portion or the balance of the oil is applied. Finally, the balance of the crystalline fructose or a different sugar can be applied as the final sugar coating or dusting step. Such an iterative practice of the present process steps provides coated cereal pieces with especially good adhesion of the powdered crystalline fructose coating.

After the sugar coating step, the cereal pieces are desirably cooled to below the melting point of the edible oil to form the present presweetened, sugar coated puffed cereal pieces. Conventionally, the cereal pieces are merely allowed to come to ambient temperatures.

A variety of optional ingredients can be added either to the edible oil or to the dry sugar coating. Such optional ingredients can include flavors, colors, vitamins, preservatives, and the like. If present, such ingredients can comprise up to about 15 parts per 100 parts cereal base.

The methods and products of the present invention are illustrated by the following examples:

EXAMPLE I

A ready-to-eat, coated cereal of the present invention is prepared having the following formulation.

| Amount | Ingredient | Weight % |
|---|---|---|
| 687.800 g. | Cereal base[1] | 68.434 |
| 158.750 | Crystalline fructose | 15.794 |
| 86.318 | Concentrated HFCS 90[2] | 8.588 |
| 70.000 | Coconut Oil (92° F.) | 6.965 |
| 2.200 | Vitamin Mix[3] | 0.219 |
| 1005.068 | | 100.000 |

[1]Cheerios ® brand puffed oat cereal.
[2]A commercial corn syrup having apx. 90% fructose based on total saccharides and a moisture content of 20%.
[3]In aqueous solution.

Thus, the ratio of crystalline fructose to HFCS is apx. 2:1. While the weight ratio of syrup to cereal pieces is about 1:0.12.

The above-coated cereal composition is prepared in the following manner.

First, the cereal base is charged to a rotating drum. While being rotated, the cereal pieces are sprayed with the vitamin mix. Thereafter, the cereal pieces are dried in a forced hot air oven for apx. 30 minutes at 60° C. The moisture content of the dried cereal pieces is less than 4%.

Thereafter 99.218 g. of high fructose corn syrup (apx. 20% moisture) is heated in a beaker to apx. 250° F. to remove 12.9 g. water. Apx. 1-2 g. of powdered crystalline fructose is mixed into the hot HFCS to produce seeded HFCS.

While still hot, the seeded HFCS is enrobed onto the dried cereal pieces by applying the hot syrup to the piece while being turned in the rotating drum.

Thereafter, 78 g. of the powdered crystalline fructose, i.e., about 50%, is charged to the rotating drum to coat the cereal pieces. Thereafter, 35 g. of melted coconut oil, or 50% is applied to the coated cereal pieces by sparging the oil onto the cereal pieces while being agitated in the rotating drum. Next, 39 g. or 25% of the crystalline fructose is charged to the rotating drum while the coconut oil is still warm. Then, 17 g. or about 25% of the coconut oil is similarly applied to the cereal pieces followed by 20 g. or about 12.5% of the crystalline fructose and the 17 g. or about 25% more of the melted coconut oil. Finally, the coated cereal pieces are coated or dusted with 19.75 g. or the remaining apx. 12.5% of the crystalline fructose.

The crystalline fructose had been ground and had the following sieve screen analysis on U.S. Standard No. 60 (250 microns): 2.32%
on U.S. Standard No. 100 (140 microns): 12.12%
on U.S. Standard No. 230 (62 microns): 38.96%
on U.S. Standard No. 325 (44 microns): 50.44%

If no conversion of amorphous fructose to crystalline occurred, then the concentration of beta-fructose should be apx. 87% as indicated by the following calculation in Table I.

TABLE I

| Source | Total Fructose |
|---|---|
| HCFC | 71.437 g. |
| 99.218 g. HFCS × 0.80 solids × 0.90 amorphous fructose/ HFCS solids | |
| Crystalline Fructose | 158.75 |
| | 230.187 g. |
| | Total beta-pyranose |
| HFCS | 46.005 g. |
| 71.437 g. amorphous fructose × 0.66 beta-pyranose/ amorphous fructose* | |
| Crystalline fructose | 154.305 |
| 158.75 g. crystalline fructose × 0.972 beta-pyranose/ crystalline fructose* | 200.310 g. |

$$\frac{\text{Total beta-pyranose}}{\text{Total fructose}} = \frac{200.310 \text{ g.}}{230.187 \text{ g.}} = 87.02\%$$

*measured concentration of beta-pyranose

However, the concentration of beta-pyranose measured by GLC (gas/liquid chromatography) initially after preparation (e.g., 1 day to 1 week) is determined to be 94.5%. Accordingly, much of the amorphous fructose has been converted into the sweet form of beta-pyranose.

After cooling to room temperature, the coated cereal pieces of the present invention are packaged in a conventional cereal carton having a glassine (plastic paper) liner.

Samples of the boxed cereal are placed in accelerated storage including periodic temperature and humidity fluctuations. Periodic sampling up to 10 weeks showed minimal blocking.

EXAMPLE II

A ready-to-eat, coated cereal of the present invention is prepared having the following formulation:

| Amount | Ingredient | Weight % |
|---|---|---|
| 1385.060 g. | Cereal base | 68.272 |
| 237.474 | Crystalline fructose | 11.705 |
| 261.840 | HFCS 90* | 12.906 |
| 140.000 | Coconut Oil 92° | 6.900 |
| 4.400 | Vitamin mix | 0.217 |
| 2028.774 g. | | 100.000 |

*Dried from 296.84 g. to a moisture content of 9.3%.

The weight ratio of crystalline fructose to HFCS is about 1:1 while the weight ratio of seeded syrup to cereal pieces is about 1:0.19.

The above coated cereal is prepared by applying the vitamin mix and drying as in Example I.

296.84 g. of HFCS (or 80% solids) is heated in a beaker to remove 35 g. of moisture. Apx. 4 g. of crystalline fructose is added to the hot, concentrated HFCS to form the seeded HFCS. The seeded HFCS is applied to the cereal base pieces while hot in a rotating drum enrober.

The remaining crystalline fructose and all the melted coconut oil is applied to the syrup-coated cereal pieces operatively alternating each in order as described in Example I.

The calculated beta-pyranose is determined as in Example I to be 81.66%. However, the beta-pyranose as measured by GLC is determined to be 93.17% indicating conversion in situ of amorphous fructose to beta-pyranose.

Suitable coated cereals of the present invention are realized when the coconut oil in Example II is replaced with an equivalent amount of soybean oil or safflower seed oil.

EXAMPLE III

A ready-to-eat, coated cereal of the present invention is prepared having the following formulation:

| Amount | Ingredient | Weight % |
|---|---|---|
| 677.80 g. | Cereal base | 67.0114 |
| 144.00 | Crystalline fructose | 14.2367 |
| 107.47 | HFCS 55 | 10.6251 |
| 80.00 | Coconut Oil 92° | 7.9093 |
| 2.20 | Vitamin mix | 0.2176 |
| 1011.47 g. | | 100.0000 |

The weight ratio of crystalline fructose to HFCS is about 1.34:1 while the ratio of seeded syrup to cereal pieces is about 1:0.16.

The cereal base pieces are coated with the vitamin mix and dried as in Example I to a moisture content of apx. 4%.

124.675 g. of the HFCS 55 is heated to remove 17.205 g. water and seeded with apx. 1.5 g. crystalline fructose and applied to the dried cereal base.

Thereafter, the remaining crystalline fructose and the melted coconut oil are alternately applied in the following order: about 70% or 100 g. crystalline fructose, 62% oil, 24% crystalline fructose, 38% oil, and the balance of the fructose is dusted over the cereal pieces while the oil remains hot.

The calculated beta-pyranose is determined to be 88.02%. However, the beta-pyranose as measured after initial preparation is determined to be 95.2% indicating in situ conversion of amorphous fructose to beta-pyranose.

What is claimed is:

1. A process for preparing a ready-to-eat cereal exhibiting enhanced sweetness, comprising the steps of:
   (a) providing pieces of ready-to-eat cereal;
   (b) coating the cereal pieces with high fructose corn syrup seeded with powdered crystalline fructose wherein the weight ratio of cereal pieces to seeded fructose corn syrup ranges from about 1:0.05 to 1:0.30 to form syrup-coated cereal pieces;
   (c) coating the syrup-coated cereal pieces with powdered crystalline fructose wherein the weight ratio of total crystalline fructose to the seeded fructose syrup ranges from about 1:1 to 2:1 to form coated cereal pieces;
   (d) applying an edible oil to the coated cereal pieces wherein the edible oil has a melting point of from about 70° F. to 120° F., wherein the weight ratio of cereal base to oil ranges from about 1:0.06 to 1:0.5, and wherein the temperature of the oil is sufficiently high such that the oil remains liquid while being enrobed onto the cereal base to form a liquid oil enrobed cereal base.

2. The process of claim 1 wherein seeded fructose corn syrup comprises a mixture of high fructose corn syrup and crystalline fructose and wherein the weight ratio of high fructose corn syrup to seeded crystalline fructose ranges from about 1:0.01 to 1:0.04.

3. The process of claim 2 wherein the high fructose corn syrup has a moisture content of less than about 10%.

4. The process of claim 3 wherein the cereal pieces have a moisture content of less than about 5%.

5. The process of claim 4 wherein crystalline fructose has a particle size of between about 15 to 200 microns.

6. The process of claim 5 additionally comprising the step of,
   (e) coating the liquid oil enrobed cereal with a powdered sugar.

7. The process of claim 6 wherein the weight ratio of powdered sugar to cereal base ranges from about 0.01:1 to 0.06:1 and wherein the particle size of the powdered sugar ranges from about 15 to 200 microns.

8. The process of claim 7 wherein the powdered sugar is selected from the group consisting of sucrose, dextrose, crystalline fructose, glucose, and mixtures thereof.

9. The process of claim 8 wherein the powdered sugar is crystalline fructose.

10. The process of claim 8 wherein the powdered sugar is sucrose.

* * * * *

UNITED STATES PATENT AND TRADEMARK OFFICE
CERTIFICATE OF CORRECTION

PATENT NO. : 4,379,171
DATED : April 5, 1983
INVENTOR(S) : Ivan Furda, Shirley C. Gengler It is certified that error appears in the above-identified patent and that said Letters Patent are hereby corrected as shown below:

Abstract, line 6, "in situ" should be -- *in situ* --.

Col. 1, line 38, -- made -- should be added after "have been".

Col. 1, line 51, "within" should be -- which -- .

Col. 2, line 35, "in situ" should be -- *in situ* --.

Col. 2, line 42, "in situ" should be -- *in situ* --.

Col. 4, line 67, "in situ" should be -- *in situ* --.

Col. 6, line 15, "mouthful" should be -- mouthfeel --.

Col. 7, line 23, "of" first occurrence should be -- or --.

Col. 9, line 39, "in situ" should be -- *in situ* --.

Col. 10, line 13, "in situ" should be -- *in situ* --.

Signed and Sealed this

Twenty-sixth Day of July 1983.

[SEAL]

Attest:

GERALD J. MOSSINGHOFF

Attesting Officer

Commissioner of Patents and Trademarks